May 3, 1960

A. F. WILLIAMS 2,935,146

HITCH FOR TRAILED IMPLEMENTS

Filed Feb. 28, 1957

INVENTOR.
ALAN F. WILLIAMS
BY
James E. Miller
ATTORNEY.

May 3, 1960 A. F. WILLIAMS 2,935,146
HITCH FOR TRAILED IMPLEMENTS
Filed Feb. 28, 1957 2 Sheets-Sheet 2

INVENTOR.
ALAN F. WILLIAMS
BY
James E. Nilles
ATTORNEY.

United States Patent Office 2,935,146
Patented May 3, 1960

2,935,146

HITCH FOR TRAILED IMPLEMENTS

Alan F. Williams, Strathmore, Victoria, Australia, assignor to Massey-Ferguson Inc., a corporation of Maryland Application February 28, 1957, Serial No. 643,031

2 Claims. (Cl. 172—317)

This invention relates to hitches for coupling a tractor having a vertically positionable drawbar to an implement which has a vertically adjustable earth working part.

An object of this invention is to provide a hitch mechanism for a pulled type implement having vertically adjustable ground engaging tools, said mechanism permitting the tractor and trailed implement to pass over undulating ground and at the same time maintaining the tools at a constant working depth; the mechanism also providing that the tools can be raised to the transport position by the vertically adjustable drawbar of the tractor.

Another object of the invention is to provide a hitch for a trail-type implement having adjustable earth working tools, said hitch connecting the implement to a tractor and providing for adjustment of the tools by an elevationally positionable tractor drawbar in such a manner so as to maintain the tools at a constant working depth regardless of relative movement between the tractor and implement in either vertical or horizontal directions.

Other objects and advantages will become more apparent from the following detailed description, taken in conjunction with the attached sheets of drawings in which, by way of preferred example only, is illustrated the invention.

Figure 1:
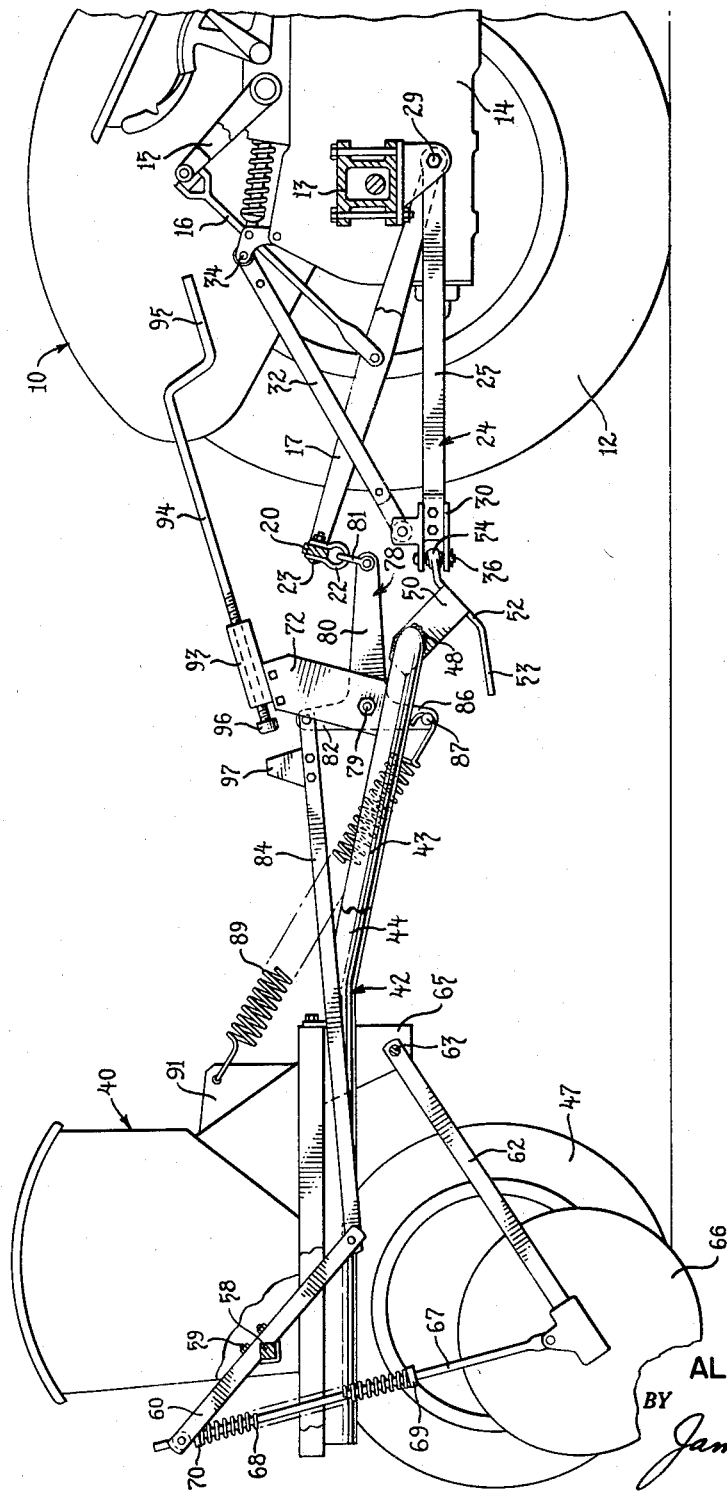
Figure 1 is a right side elevational view showing a hitch made in accordance with this invention and connecting an implement, shown here as a grain drill, with a tractive vehicle. Certain parts have been broken away or shown in section for purposes of clarity.
Figures 2, 3:
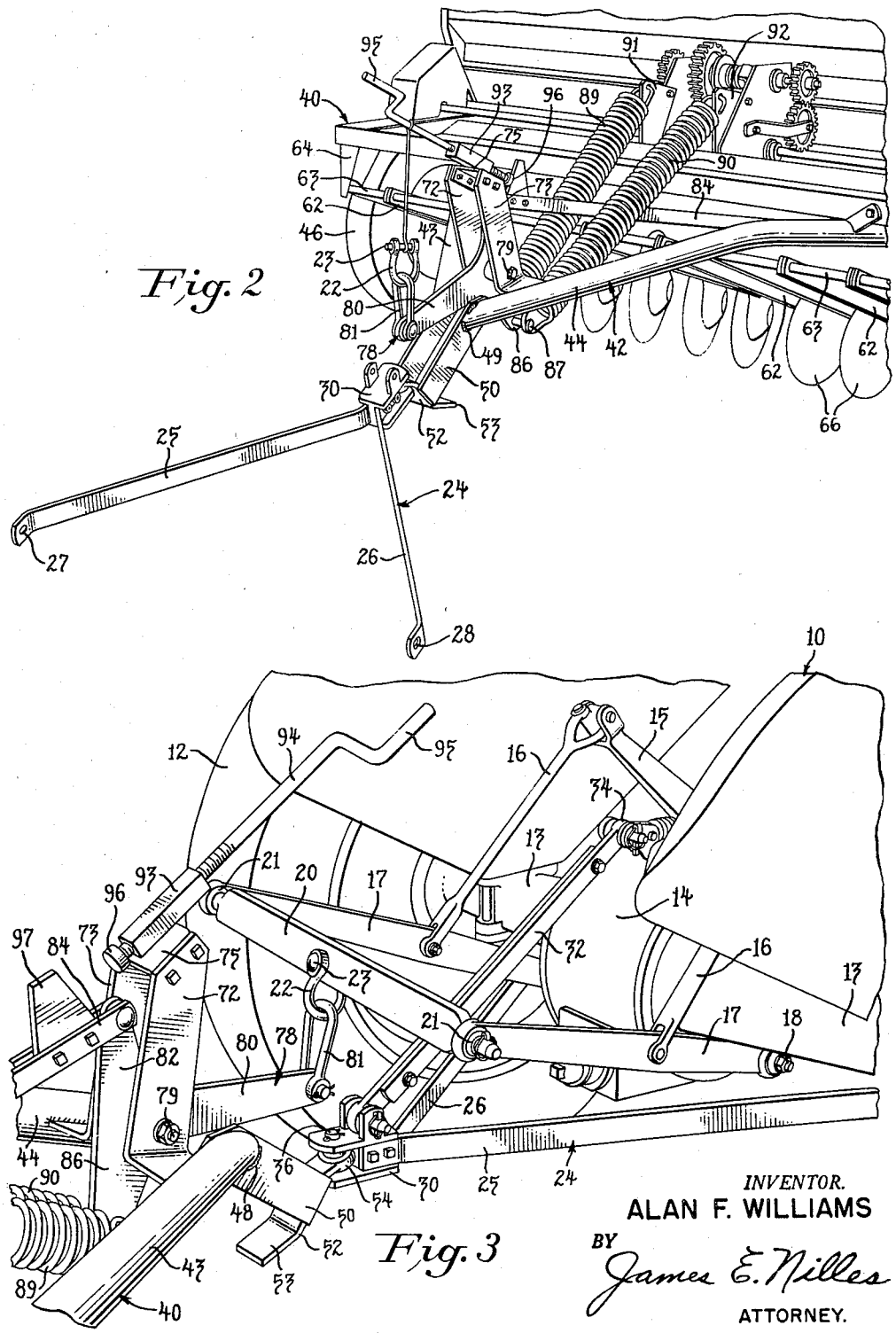
Figure 2 is a perspective view of the hitch mechanism of Figure 1, but shown as being disconnected from the tractor.
Figure 3 is a perspective view of part of the hitch shown in Figure 1, but on an enlarged scale.

Referring more particularly to the drawings, the tractor 10 is of the well known type and has rear traction wheels 12 carried on axle housings 13 of the rear housing 14. The pair of lift arms 15 are actuated by the hydraulic system of the tractor in the well known manner and are connected by lift links 16 to the laterally spaced, lower draft links 17 for vertically positioning the latter. The draft links are swivelly connected at their front ends to the tractor housing as at 18 and their rear ends are connected together by the drawbar 20 by the conventional ball and socket joints 21. A clevis 22 is connected by pin 23 to the center of the drawbar. Thus the drawbar can be positioned vertically by the tractor hydraulic system.

A fixed hitch frame is also carried by the tractor in the form of a lower yoke 24 having forwarding diverging legs 25, 26 which are secured at their forward ends 27, 28, respectively, to the tractor at laterally spaced points 29 (only one shown—Fig. 1). The rear end of the fixed hitch frame or yoke terminates in a bracket 30 and is connected by a strap 32 to an upper portion of tractor body as at 34. The bracket 30 is bifurcated at its rear end for the reception of the hitch pin 36. Thus the hitch pin 36 forms a fixed hitch point, relative to the tractor, for the implement about to be described. It should be noted that clevis 22 and hitch means 36 are in substantial alignment in a vertical direction, the latter positioned directly beneath the clevis.

The implement 40 shown here for illustrative purposes is a grain drill having a support frame 42 including the forwardly converging tubular frame members 43, 44. This rigid main frame 42 is carried by a pair of laterally spaced ground wheels 46, 47. The frame members 43, 44 are welded as at 48, 49, respectively, to the front end portion 50. Portion 50 has a bracket 52 welded thereto the rear part 53 of which forms a stand when the implement is detached from the tractor. On the front end of bracket 52 is a ball connector 54 for swivelly mounting on hitch pin 36. In this manner the front end of the implement frame is pivotally connected to the vertically fixed hitch means and complete freedom of movement in horizontal and vertical directions is permitted between the tractor and implement.

The ground working tools and the mechanism for operating them will now be described. Mounted on the implement frame for limited rotational movement is the rockshaft 58 which extends transversely along the frame. Secured along the length of the rockshaft by U-bolt means 59 are a plurality of arms 60. A plurality of drag bars 62 are pivotally connected at their forward ends to a common transverse pivot bar 63 mounted in brackets 64, 65 of the main frame. At the rear end of each drag bar is rotatably mounted a ground working tool in the form of a disc furrow opener 66 which serves to slice through the ground at a predetermined and adjustable depth to form a furrow. A pressure rod 67 connects the rear end of each drag bar 62 to its corresponding rockshaft arm 60. A spring 68 bears against a stop 69 on the rod 67 and also against a collar 70 carried by the arm 60, so as to yieldingly hold the discs at their working depth. The ground working tools 66 and the mechanism for operating them thus far described are conventional and well known.

Between the forward ends of frame members 43, 44, and rigidly secured thereto by welding, are upstanding plate-like members 72, 73. These members are spaced apart and rigidly secured together at their upper ends by the brace 75. An actuating member 78, in the form of a three-arm bell-crank, is pivotally mounted on a transverse axis formed by bolt means 79 extending between members 72, 73. The bell crank includes a generally forwardly extending arm 80 which is connected at its front end by clevis 81 to the clevis 22 thus forming a flexible or "one way" connection. Another arm 82 extends generally upwardly and is connected at its upper end to the rockshaft arm 60 by the rearwardly extending thrust link 84. A third arm 86 of the crank extends downwardly and has a short pin 87 extending through its lower end and rigidly secured thereto. A pair of large tension springs 89, 90 are hooked at their forward ends on pin 87 and to the brackets 91, 92 secured to the implement frame.

An adjustable depth control is provided for the tools which limits the depth to which the large springs 89, 90 force them into the ground. Secured to the uppermost portion of brace 75 is a threaded block 93. A large crank 94 is threadably engaged in block 93 and has a crank handle portion 95 operable from the tractor seat. The rearmost end 96 of the crank 94 is adapted to bear against a projection 97 secured to the link 84 when the tools have reached their full working depth. In other words, the large springs rotate the bell crank in a clockwise direction, as viewed in Figure 1, until the projection 97 abuts against the crank end 96.

Operation

In the position shown in Figure 1, assume the draft links 17 are being raised and have caused the bell-crank to rotate counter-clockwise about point 79, causing thrust link 84 to move rearwardly and rotating the rockshaft 58 clockwise to raise the tools. The stop or projection 97 has moved away from the crank end 96 and the large springs 89, 90 are being extended. As previously mentioned the hitch point 36 for the implement frame and the point of connection between the actuating member 78 and draft links 17 are in substantial vertical alignment and relatively close together in a vertical direction. Therefore, any articulating movement between tractor and implement does not materially effect the relative disposition of these points. As a result, in the transport position (fully raised) the height of the discs does not change materially due to pitching of the tractor.

When the discs have been lowered to their full extent, as determined by the adjustable crank 94, further lowering of the draft links 17 causes the flexible connection of the clevis 22, 81 to become slack. The working depth of the tools is then completely unaffected by relative pitching movement between implement and tractor.

It should be understood that it is not intended to limit the invention to the above described forms and details, and that the invention includes such other forms and modifications as are embraced by the scope of the appended claims.

I claim:

1. In combination with a tractor having a pair of vertically positionable, laterally spaced draft links pivotally secured at the rear end of the tractor, a drawbar secured between the rear ends of said links, said tractor also having a vertically fixed hitch means directly beneath said drawbar, a hitch mechanism for an implement having a forwardly extending support frame and an earth working tool supported on said frame for vertical movement relative thereto, said frame having means at its forward end providing a swivel connection to said fixed hitch means on the tractor, a three armed lever pivotally mounted on said frame to rock about a generally transverse axis, spring means interposed between said frame and one arm of said lever yieldably urging the lever in one direction, flexible means connecting another arm of said lever with said drawbar at a location above and substantially in a vertical alignment with said hitch means operative upon vertical movement of the drawbar to rock said lever about its pivot against the force exerted by said spring means, and a thrust link connecting the third arm of said lever with the support for said tool effective to raise the tool incident to the raising of the drawbar.

2. In combination with a tractor having a pair of vertically positionable, laterally spaced draft links pivotally secured at the rear end of the tractor, a drawbar secured between the rear ends of said links, said tractor also having a vertically fixed hitch means directly beneath said drawbar, a hitch mechanism for an implement having a forwardly extending support frame and an earth working tool supported on said frame for vertical movement relative thereto, said frame having means at its forward end providing a swivel connection to said fixed hitch means on the tractor, a three armed lever pivotally mounted on said frame to rock about a generally transverse axis, spring means interposed between said frame and one arm of said lever yieldably urging the lever in one direction, flexible means connecting another arm of said lever with said drawbar at a location above and substantially in a vertical alignment with said hitch means operative upon vertical movement of the drawbar to rock said lever about its pivot against the force exerted by said spring means, a thrust link connecting the third arm of said lever with the support for said tool effective to raise the tool incident to the raising of the drawbar, an adjustable stop on said frame, adjusting means extending forwardly from said stop for manipulation from the tractor, and stop means on said link engageable with said adjustable stop to limit the upward movement of said tool under the influence of said spring means.

References Cited in the file of this patent

UNITED STATES PATENTS

| | | |
|---|---|---|
| 2,520,345 | Starr | Aug. 29, 1950 |
| 2,691,934 | Erwin | Oct. 19, 1954 |

FOREIGN PATENTS

| | | |
|---|---|---|
| 942,598 | Germany | May 3, 1956 |